(12) United States Patent
Hepfinger et al.

(10) Patent No.: US 9,061,448 B2
(45) Date of Patent: Jun. 23, 2015

(54) PROCESS FOR FORMING A DIVIDED CONDUIT

(75) Inventors: John M. Hepfinger, Newnan, GA (US); Bernhard Zeiler, Moore, SC (US)

(73) Assignee: Milliken & Company, Spartanburg, SC (US)

( * ) Notice: Subject to any disclaimer, the term of this patent is extended or adjusted under 35 U.S.C. 154(b) by 24 days.

(21) Appl. No.: 13/088,859

(22) Filed: Apr. 18, 2011

(65) Prior Publication Data

US 2012/0261062 A1 Oct. 18, 2012

(51) Int. Cl.
| | |
|---|---|
| *B29C 47/02* | (2006.01) |
| *B29C 47/00* | (2006.01) |
| *B29C 65/02* | (2006.01) |
| *B29C 65/78* | (2006.01) |
| *B29C 47/06* | (2006.01) |
| *H02G 3/04* | (2006.01) |
| *F16L 9/19* | (2006.01) |
| *F16L 11/22* | (2006.01) |

(Continued)

(52) U.S. Cl.
CPC ............ *B29C 47/0028* (2013.01); *B29C 65/028* (2013.01); *B29C 65/7838* (2013.01); *F16L 9/19* (2013.01); *F16L 11/22* (2013.01); *H02G 9/065* (2013.01); *H02G 3/0481* (2013.01); *B29L 2023/00* (2013.01); *B29C 47/02* (2013.01); *B29C 47/062* (2013.01)

(58) Field of Classification Search
CPC .... B29C 47/026; B29C 47/025; B29C 47/02; B29C 47/0028; B29C 47/0064; B29C 65/028; B29C 65/7838; B29C 66/61; H02G 9/065; H02G 3/0481; H02G 3/0487; H02G 3/0468; H02G 3/0462; F16L 9/19; F16L 11/22

USPC ........... 156/244.12, 244.13, 303.1; 174/72 R, 174/95, 96, 97, 72 TR; 138/112, 115, 116, 138/117; 264/177.1, 209.1, 209.8
See application file for complete search history.

(56) References Cited

U.S. PATENT DOCUMENTS

| | | | |
|---|---|---|---|
| 3,825,641 A | 7/1974 | Barnett | 264/89 |
| 3,911,200 A | 10/1975 | Simons et al. | 174/36 |
| 3,924,992 A | 12/1975 | Hegler | 425/233 |

(Continued)

FOREIGN PATENT DOCUMENTS

| | | |
|---|---|---|
| EP | 1 039 201 | 9/2000 |
| EP | 1 087 488 | 3/2001 |

(Continued)

OTHER PUBLICATIONS

Brandrup, J., E.H. Immergut, and E.A. Grulke, Polymer Handbook, 1999, pp. V-164 and V-167.*

(Continued)

*Primary Examiner* — William Bell
(74) *Attorney, Agent, or Firm* — Cheryl J. Brickey

(57) ABSTRACT

A method of producing a divided conduit comprising forming a strip-shaped substrate having a first longitudinal edge and a second longitudinal edge. The strip-shaped substrate is a strip-shaped textile or a strip-shaped film. Then extruding a molten thermoplastic into the form of a conduit and placing the one strip-shaped substrate within the extruded conduit during or directly after conduit formation. The first longitudinal edge and the second longitudinal edge of the strip-shaped substrate adhere to or embed into the inner surface of the conduit.

6 Claims, 3 Drawing Sheets

(51) Int. Cl.
*H02G 9/06* (2006.01)
*B29L 23/00* (2006.01)

(56) References Cited

U.S. PATENT DOCUMENTS

| | | | | |
|---|---|---|---|---|
| 4,182,582 A | * | 1/1980 | Youval et al. | 405/45 |
| 4,191,518 A | | 3/1980 | Kojimoto et al. | 425/326.1 |
| 4,478,563 A | | 10/1984 | Lhommeau et al. | 425/71 |
| 4,655,987 A | | 4/1987 | Zertuche | 264/563 |
| 4,674,167 A | | 6/1987 | Hubbard et al. | 29/401.1 |
| 4,729,409 A | | 3/1988 | Paul | 138/115 |
| 4,906,496 A | | 3/1990 | Hosono et al. | 428/36.9 |
| 4,975,055 A | | 12/1990 | LaPlante | 433/82 |
| 5,097,870 A | * | 3/1992 | Williams | 138/115 |
| 5,246,070 A | | 9/1993 | Greve et al. | 166/242 |
| 5,587,115 A | | 12/1996 | Allen | 264/1.24 |
| 5,816,742 A | * | 10/1998 | Cordewener | 405/43 |
| D405,522 S | * | 2/1999 | Hoenig et al. | D24/110 |
| 6,262,371 B1 | * | 7/2001 | Allen | 174/68.1 |
| 6,274,813 B1 | * | 8/2001 | Houte et al. | 174/68.3 |
| 6,304,698 B1 | | 10/2001 | Morris | 385/100 |
| 6,421,485 B2 | | 7/2002 | Morris | 385/100 |
| 6,564,831 B1 | | 5/2003 | Sanoner et al. | 138/115 |
| 6,671,440 B2 | | 12/2003 | Morris | 385/100 |
| 6,718,100 B2 | | 4/2004 | Morris | 385/100 |
| 6,755,217 B1 | * | 6/2004 | Yoshida et al. | 138/121 |
| 6,876,797 B2 | | 4/2005 | Morris | 385/100 |
| 7,085,455 B2 | | 8/2006 | Morris | 385/100 |
| 7,085,458 B2 | | 8/2006 | Morris | 385/110 |
| 7,156,126 B2 | | 1/2007 | Topek et al. | 138/117 |
| 7,174,074 B2 | | 2/2007 | Morris | 385/100 |
| 7,319,802 B2 | | 1/2008 | Morris | 385/109 |
| 7,754,971 B2 | | 7/2010 | Bedingfield et al. | 174/117 M |
| 7,799,997 B2 | | 9/2010 | Bedingfield et al. | 174/93 |
| 2002/0036019 A1 | * | 3/2002 | Woelfel et al. | 138/115 |
| 2005/0074218 A1 | | 4/2005 | McLarty, III | 385/134 |
| 2005/0194578 A1 | | 9/2005 | Morris | 254/134.3 |
| 2008/0054236 A1 | | 3/2008 | Morris | 254/134.4 |
| 2011/0004197 A1 | * | 1/2011 | Sansoucy | 604/523 |

FOREIGN PATENT DOCUMENTS

| | | | |
|---|---|---|---|
| EP | 2 557 345 | | 2/2013 |
| GB | 1258181 A | * | 12/1968 |
| GB | 2161656 A | * | 1/1986 |
| JP | 57167218 A | * | 10/1982 |
| JP | 3227604 | | 10/1991 |
| JP | 8312841 | | 11/1996 |
| JP | 10 110465 | | 4/1998 |
| KR | 10 0959242 | | 5/2010 |
| WO | WO 79/01125 | | 12/1979 |
| WO | WO 99/46529 | | 9/1999 |
| WO | WO 00/79662 | | 12/2000 |
| WO | WO 2009/072750 | | 6/2009 |
| WO | WO 2012/074585 | | 6/2012 |

OTHER PUBLICATIONS

Patent Cooperation Treaty PCT International Search Report. Date of Mailing, Aug. 21, 2013. International Application No. PCT/US2012/024053. International Filing Date, Feb. 7, 2012.

* cited by examiner

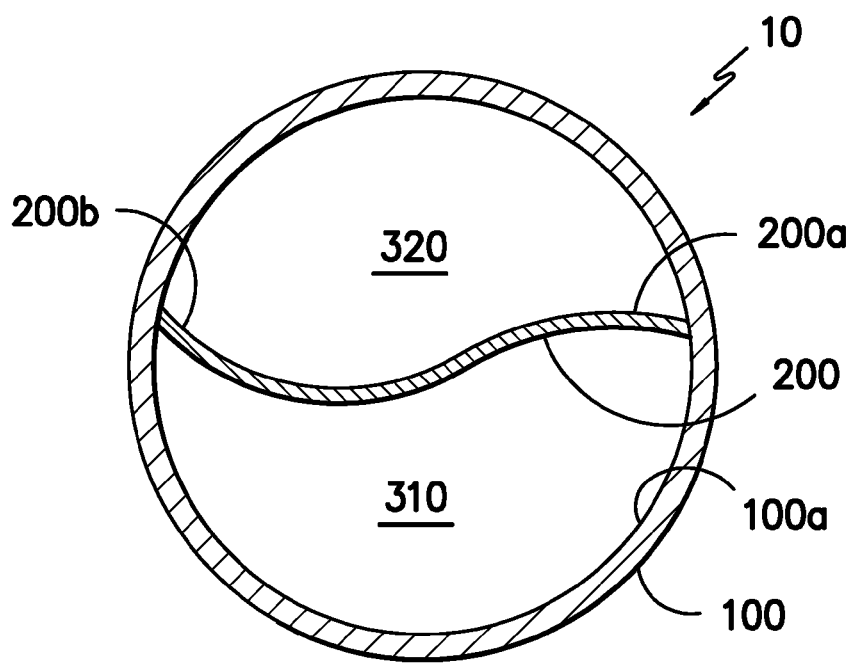
FIG. -1-
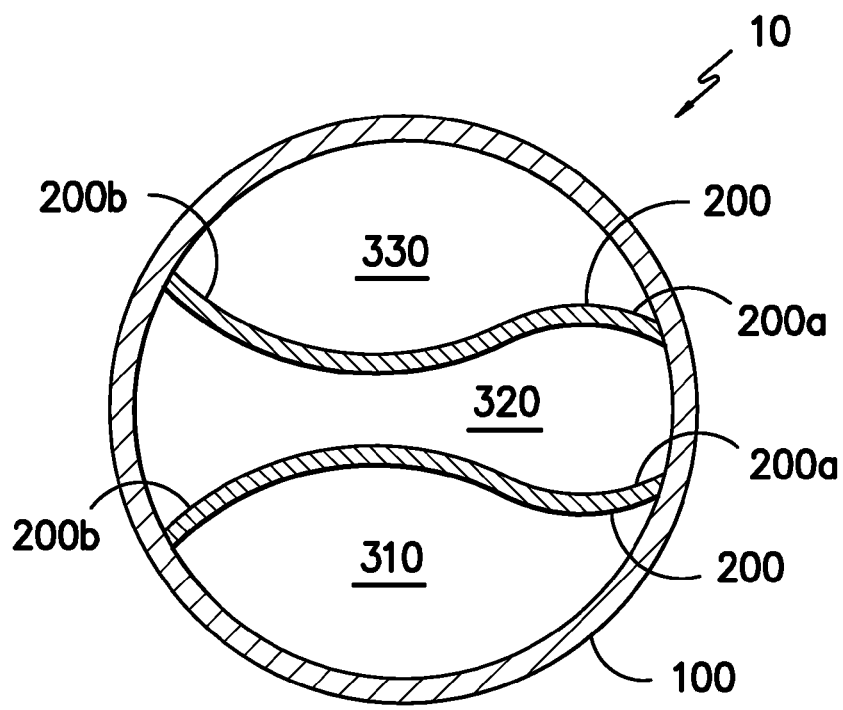
FIG. -2-

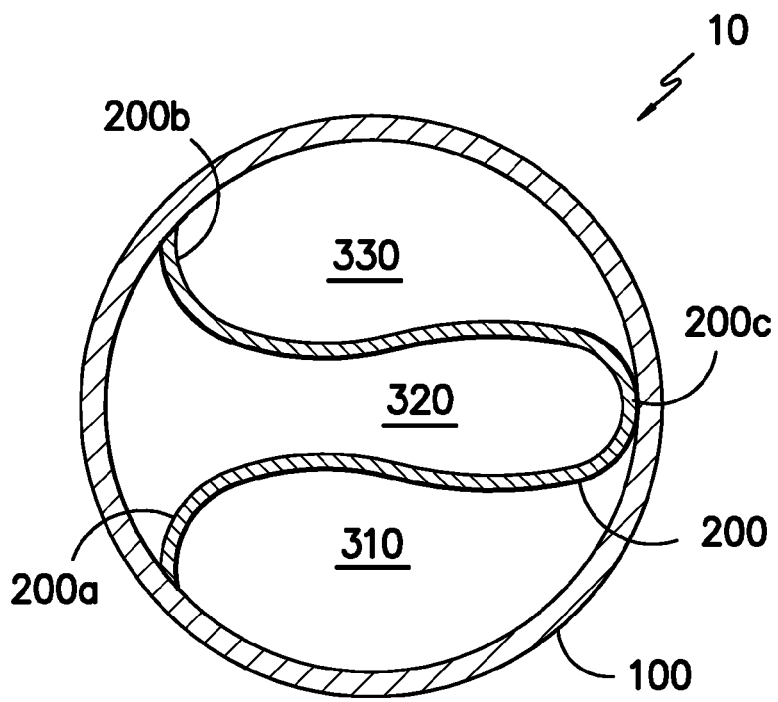
FIG. -3-
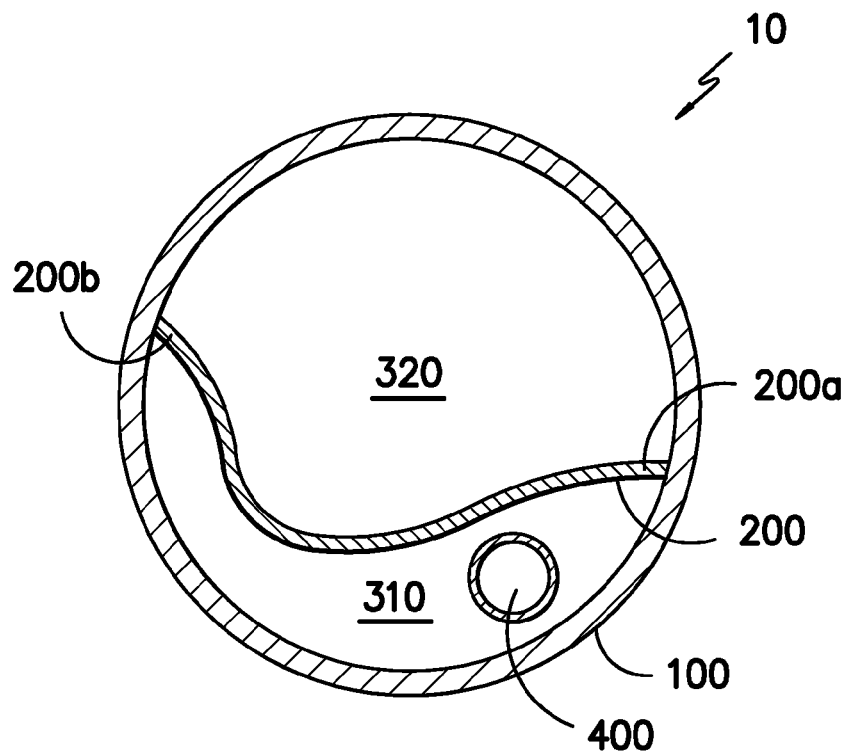
FIG. -4-

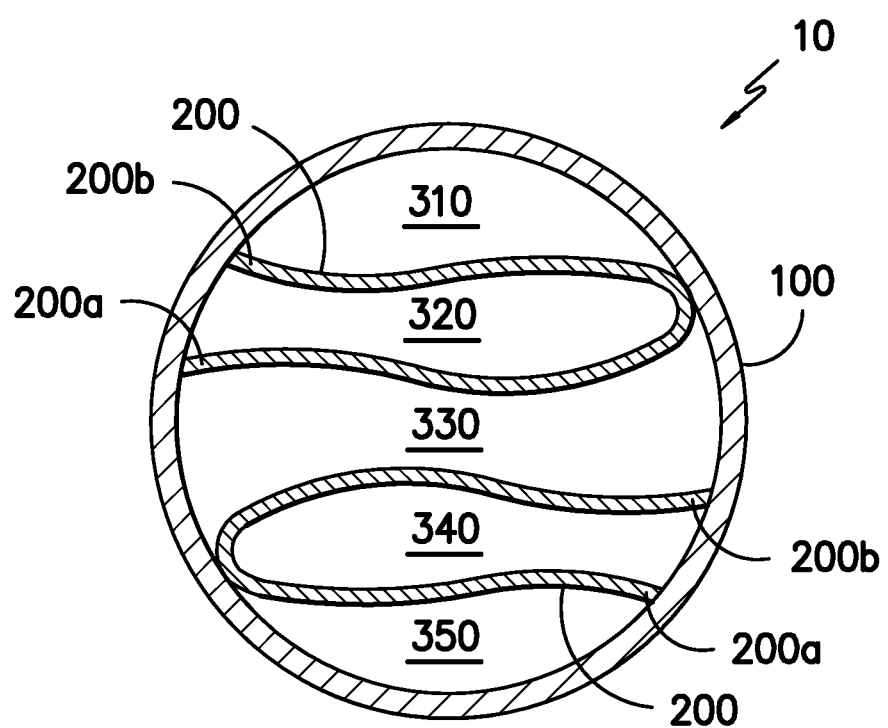
FIG. -5-

PROCESS FOR FORMING A DIVIDED CONDUIT

RELATED APPLICATIONS

This application is related to U.S. patent application Ser. No. 13/088,837, "Divided Conduit" filed on Apr. 18, 2011, now U.S. Pat. No. 8,809,682.

TECHNICAL FIELD

The present disclosure generally relates to processes to form divided conduits into which cables, such as fiber optic cables, coaxial cables, and the like, may be positioned. More particularly, the present disclosure relates to processes to form divided conduits having a strip-shaped substrate attached to the conduit on its longitudinal edges separating the conduit into two or more longitudinal channels.

BACKGROUND

Cable, such as fiber optic communication cable, is often provided underground in great lengths, and may even extend for many miles. It is known in the art to bury the cable in the ground so that the area above-ground is not cluttered with the cable and its respective support apparatus. Furthermore, by positioning the cable underground, it is more protected from the weather and other potentially damaging circumstances.

It is also known in the cable art to position the cable within a conduit in order to more fully protect the cable during in-ground installations. The conduit, which is often formed from lengths of polyvinyl chloride tubing, polyethylene tubing or the like, is laid in the ground, after which a rope is placed in the conduit either by blowing or rodding. The rope, in turn, is attached to one of the communication cables. By pulling the rope from one end of the conduit, the cable is drawn through the conduit into position. Once placed within the conduit, the cable is protected from damage which may be caused by weather, water, and the like.

When a conduit is in place, it may be subsequently desired to run a second communications cable at the same location. As such, it would be desirable from a cost and time standpoint to make use of the dead space within an existing conduit, rather than lay a new length of conduit. However, it has been found that it is difficult to merely insert a second cable into a conduit that already contains a first cable. When a rope is blown or "snaked" into a conduit already containing a cable (or when a second cable is "snaked" through a conduit with a pre-laid cable), the rope (or cable) is often impeded by the first cable. In such cases, the rope (or second cable) becomes tangled with, or twisted around, the first cable, causing damage to the cables.

It has been suggested to provide a divider to be inserted into a conduit in order to separate the conduit into discrete sections, thus making insertion of the second cable easier. A problem has been encountered in that when conduit is placed over long distances, undulations will invariably occur therein. Also, planned curves, such as at underpasses or the like, will often be encountered rendering the placement of known dividers therein difficult, if not impossible.

A need exists, therefore, for a device to separate or partition a conduit, such as an underground communication cable conduit, into discrete sections. A need also exists for a partitioning device which will provide for improved use of the space within a conduit.

BRIEF SUMMARY

Provided is a method of producing a divided conduit comprising forming a strip-shaped substrate having a first longitudinal edge and a second longitudinal edge. The strip-shaped substrate is a strip-shaped textile or a strip-shaped film. Then extruding a molten thermoplastic into the form of a conduit and placing the one strip-shaped substrate within the extruded conduit during or directly after conduit formation. The first longitudinal edge and the second longitudinal edge of the strip-shaped substrate adhere to or embed into the inner surface of the conduit. Also disclosed is a process to form the divided conduit by co-extruding the strip-shaped film and the conduit simultaneously.

BRIEF DESCRIPTION OF THE DRAWINGS

An exemplary embodiment of the present invention will now be described by way of example, with reference to the accompanying drawings, wherein:

FIG. 1 is an illustration of one embodiment of the invention having one strip-shaped substrate forming two channels.

FIG. 2 is an illustration of one embodiment of the invention having two strip-shaped substrates forming three channels.

FIG. 3 is an illustration of one embodiment of the invention having one strip-shaped substrate forming three channels.

FIG. 4 is an illustration of one embodiment of the invention having one strip-shaped substrate forming two channels, where the strip-shaped substrate is moved towards the inner surface of the conduit.

FIG. 5 is an illustration of one embodiment of the invention having two strip-shaped substrates forming five channels.

DETAILED DESCRIPTION

The divided conduits described herein are readily manufactured. Each divided conduit provides a structure that allows cables to be pulled through without snagging or excessive heat build-up due to friction. In addition, the divided conduits do not allow contact or alternation losses between adjacent cables in other channels of the conduit.

The term "strip-shaped substrate" refers to a long strip of flexible material made of any suitable material such a textile or film. The term "longitudinal edges" refers to the edges along the length of the strip-shaped substrate. The term "longitudinal axis" refers to the axis of the strip-shaped substrate along its length. "Integral", in this application, means that two of more materials are connected with each other without the further use of any glues or adhesives. The divided conduit may be considered to be integral.

Referring now to FIG. 1, there is shown one embodiment of the divided conduit 10. In FIG. 1, the conduit 100 contains one strip-shaped substrate 200. The strip-shaped substrate 200 has two longitudinal edges, a first longitudinal edge 200a and a second longitudinal edge 200b, both of which are adhered to the inner surface 100a of the conduit 100. This forms two channels 310 and 320 where cables or other elongated structures may be placed. The cables or other elongated structures may be placed into the channels during the formation of the divided conduit, after the conduit is formed, or after the conduit is installed. The divided conduit formed is flexible and a lower weight then some alternative technologies.

The conduit 10 (also sometimes referred to as a pipe or tube), may be any suitable conduit formed from an extrudable material such as a thermoplastic. The conduit may have any suitable wall thickness, inner diameter, and outer diameter. Conduits for use in the fiber optic field tend to have an inner diameter of about 12 mm to 50 mm. In other embodiments, the conduit may have a very large inner diameter, for example from about 100 mm to 150 mm, or may have a very small diameter such as less than about 50 mm. The conduit is preferably flexible. In one embodiment, the conduit is formed from a polymer selected form the group consisting of polyethylene, polypropylene, polyester, and polyvinyl chloride. The conduit may contain a bumpy finish to reduce the amount of contact the film has with the cable, pull line, or other elongated structure. In one embodiment, the inner or outer surface of the conduit has a textured surface. One example of a textured surface is an "orange peel" finish, where the texture resembles the bumpy surface of the skin of an orange (fruit). This textured surface may serve to reduce the coefficient of friction and allow for easier insertion of cables or other elongated structures. The conduit may be smooth-wall, corrugated, or the like.

The strip-shaped substrate 200 may be formed of any suitable material. The strip-shaped substrate should be flexible, have a low coefficient of friction to avoid cable damage and preferably have a high strength to avoid tearing during cable installation. In one embodiment, the strip-shaped substrate should be able to withstand the extrusion temperatures of the thermoplastic polymer used to form the conduit.

Preferably, the coefficient of friction for the strip-shaped substrate (dynamic or sliding coefficients of friction) are between about 0.06 to about 0.14, and a narrower range of about 0.08 to about 0.13, may also be used. In one embodiment, the breaking tensile strength of the present fabric is in the range of from about 45 kg/cm to about 70 kg/cm. In another embodiment, the elongation percentages of the strip-shaped substrate are between 2% and 5% at 22.5 kg of force and between 5% and 10% at 45.5. Kg of force. The strip-shaped substrate preferably has a thickness of about 0.025 inches to 0.100 inches. The strip-shaped substrate preferably has a breaking strength of about 200 lbs/cm to 600 lbs/cm. The strip-shaped substrate preferably has air permeability of 10 $cm^3/cm^2/s$ to 70 $cm^3/cm^2/s$. Preferably the strip-shaped substrate has a rigidity of between about 100 and 400 grams force as measured by ASTM D6827.

In one embodiment, the strip-shaped substrate 200 is a strip-shaped textile. The strip-shaped textile used may be any suitable textile, but is preferably one that is flexible, has a low coefficient of friction, and a high tensile strength. The textile may be a knit, woven, non-woven, or unidirectional. The strip-shaped textile may have additional function chemistries such as low friction, fire resistance, adhesion, or color added. The chemistries may be added to the yarns during yarn formation or applied onto the yarns before or after textile formation. In one embodiment, the textile has a weight of about 2 to 20 ounces per yard and in another embodiment has a weight of about 10 to 12 ounces per yard. The space between the yarns within the textile will aid in breathability of the textile and the flexibility of the divided conduit. Further, having these shapes should allow for easier movement of the strip-shaped textile within the divided conduit to change the size of the channels and make it easier to install cables in between empty channels.

In one embodiment, the strip-shaped textile is a woven textile. The fabric base may also be, for example, plain, satin, twill, basket-weave, poplin, jacquard, and crepe weave textiles. Preferably, the woven textile is a plain weave textile. It has been shown that a plain weave has good abrasion and wear characteristics. A twill weave has been shown to have good properties for compound curves so may also be preferred for some strip-shaped textiles. The end count in the warp direction is between 35 and 70 in one embodiment. The denier of the warp yarns is between 350 and 1200 denier in one embodiment. In one embodiment, the textile is air permeable which increases the flexibility of the divided conduit and may allow for easier movement of the strip-shaped textile within the divided conduit to change the size of the channels and make it easier to install cables in between empty channels.

In another embodiment, the strip-shaped textile is a knit, for example a circular knit, reverse plaited circular knit, double knit, single jersey knit, two-end fleece knit, three-end fleece knit, terry knit or double loop knit, weft inserted warp knit, warp knit, and warp knit with or without a micro-denier face.

In another embodiment, the strip-shaped textile is a multi-axial, such as a tri-axial fabric (knit, woven, or non-woven). In another embodiment, the strip-shaped textile is a bias fabric. In another embodiment, the strip-shaped textile is a non-woven. The term non-woven refers to structures incorporating a mass of yarns that are entangled and/or heat fused so as to provide a coordinated structure with a degree of internal coherency. Non-woven fabrics for use as the strip-shaped textile may be formed from many processes such as for example, meltspun processes, hydroentangeling processes, mechanically entangled processes, stitch-bonded and the like. In another embodiment, the strip-shaped textile is a unidirectional textile and may have overlapping yarns or may have gaps between the yarns.

The yarns making up the strip-shaped textile forming the strip-shaped substrate 200 may be any suitable yarn. "Yarn", in this application, as used herein includes a monofilament elongated body, a multifilament elongated body, ribbon, strip, fiber, tape, and the like. The term yarn includes a plurality of any one or combination of the above. The yarns may be of any suitable form such as spun staple yarn, monofilament, or multifilament, single component, bi-component, or multi-component, and have any suitable cross-section shape such as circular, multi-lobal, square or rectangular (tape), and oval.

Some suitable materials for the yarns include polyamide, aramid (including meta and para forms), rayon, PVA (polyvinyl alcohol), polyester, polyolefin, polyvinyl, nylon (including nylon 6, nylon 6,6, and nylon 4,6), polyethylene naphthalate (PEN), cotton, steel, carbon, fiberglass, steel, polyacrylic, polytrimethylene terephthalate (PTT), polycyclohexane dimethylene terephthalate (PCT), polybutylene terephthalate (PBT), PET modified with polyethylene glycol (PEG), polylactic acid (PLA), polytrimethylene terephthalate, nylons (including nylon 6 and nylon 6,6); regenerated cellulosics (such as rayon or Tencel); elastomeric materials such as spandex; high-performance fibers such as the polyaramids, and polyimides natural fibers such as cotton, linen, ramie, and hemp, proteinaceous materials such as silk, wool, and other animal hairs such as angora, alpaca, and vicuna, fiber reinforced polymers, thermosetting polymers, blends thereof, and mixtures thereof.

In one embodiment, the yarns of the textile have a greater melting temperature than the thermoplastic polymer forming the conduit so they will not melt during the extrusion process forming the divided conduit. In another embodiment, the yarns do not have a melting temperature (such as yarns from a thermoset polymer or some natural fibers), but must be able to withstand the extrusion conditions of the conduit without significant loss in physical properties.

In one embodiment, the textile contains warp yarns and weft yarns which are monofilament. In another embodiment, the warp yarns are monofilament and the weft yarns are multi-filament. In another embodiment, the warp yarns are monofilament and the weft yarns are an alternating arrangement of monofilament and multifilament yarns. In another embodiment, the warp yarns and weft yarns are multi-filament. In another embodiment, the warp yarns are multi-filament. In another embodiment, the warp yarns are multifilament and the filling yarns are monofilament. The phrase "alternating arrangement" refers to a repeating pattern of monofilament to multifilament yarns. In one embodiment, the arrangement of monofilament to multifilament yarns is 1:1. Other ratios, such as 1:2, 1:3, 2:3, 3:4, or 3:5, for example, may also be employed, as product specifications dictate. For the embodiments containing monofilament yarns, the denier of the yarns is preferably between about 200 and 800 denier. For the embodiments containing multifilament yarns, the denier of the yarns is preferably between about 200 and 1,000 denier.

The strip-shaped substrate 200 may also be a strip-shaped film. Preferably, this film is made of a thermoplastic polymer, but may also be made of any other suitable material including a thermoset. Some suitable thermoplastic polymers include, but are not limited to polypropylene, polyethylene, polyester, polyvinyl alcohol, blends thereof, and co-polymers thereof. Preferably, the film is formed from a thermoplastic selected from the group consisting of polyester, polyolefin, and polyamide. The strip-shaped film may have perforations or be continuous. Perforations will aid in breathability of the film and the flexibility of the divided conduit. Further, having perforations should allow for easier movement of the strip-shaped film within the divided conduit to change the size of the channels and make it easier to install cables in between empty channels. Further, the strip-shaped film may be fiber reinforced or not. A film containing fibers may increase the breaking strength of the film. In one embodiment, at least one of the surfaces of the strip-shaped film has a textured surface. One example of a textured surface is an "orange peel" finish. This textured surface may serve to reduce the coefficient of friction and allow for easier insertion of cables or other elongated structures.

In some embodiments, an already formed, free-standing strip-shaped film is inserted into the conduit during (or directly after) the extrusion of the pipe. In one embodiment, this strip-shaped film is oriented, meaning that after extrusion the film is further stretched in at least one axis. This orienting serves to increase the dimensional stability and strength of the film to be placed into the conduit. In one embodiment, the polymer that the film is made of has a higher melting temperature than the polymer used to form the conduit. In another embodiment, the film does not have a melting temperature (such as thermoset polymer). In this embodiment, the film must be able to withstand the extrusion conditions of the conduit without significant loss in physical properties. During the manufacturing processes, the already formed, free-standing strip-shaped film is introduced into the conduit during or directly after extrusion of the conduit and the film must not lose significant physical properties during this process. The strip-shaped film may have chemistries added to the polymer before film formation or applied onto the formed film to provide for low friction, fire resistance, adhesion, or color. The film may contain a bumpy finish to reduce the amount of contact the film has with the cable, pull line, or other elongated structure.

While in FIG. 1 there is shown the strip-shaped substrate 200 adhered to the inner wall of the conduit 100 on both the first longitudinal edge 200a and the second longitudinal edge 200b, there may be embodiments where only one edge of the strip-shaped substrate is adhered to the inner wall of the conduit 100.

In one embodiment, the longitudinal edge(s) (200a, 200b) of the strip-shaped substrate 200 are embedded into the inner surface of the conduit. Being "embedded" means that the edges of the strip-shaped substrate are not just adhered to the surface of the inner wall by actually reside within the wall of the conduit such that the edge is completely covered, surrounded, and entrenched by the material of the conduit.

In one embodiment, the width of the strip-shaped substrate, defined as the distance between the first longitudinal edge 200a and the second longitudinal edge 200b is between about 32 and 60% of the inner circumference of the conduit. In another embodiment, the width of the strip-shaped substrate 200 is greater than the diameter of the conduit. For example, in FIG. 4, there is shown another embodiment of the divided conduit a longer width of the strip-shaped substrate (or film) is beneficial as it may move towards the inner surface of the conduit into one of the chambers of the divided conduit thus opening the other (unfilled) channel for less friction and easier cable installation.

FIG. 2 illustrates an additional embodiment of the invention where the divided conduit 10 contains a conduit 100 with two strip-shaped substrates 200, each strip-shaped substrates 200 having a first longitudinal edge 200a and a second longitudinal edge 200b adhered to the inner wall of the conduit 100. This forms three channels 310, 320, 330 for the placement of cables or elongated structures 400. While FIG. 2 is shown with two strip-shaped substrates 200, there may be embodiments having three or more strip-shaped substrates 200.

FIG. 3 illustrates an additional embodiment of the invention where the divided conduit 10 contains a conduit 100 with one strip-shaped substrates 200, having a first longitudinal edge 200a and a second longitudinal edge 200b adhered to the inner wall of the conduit 100 as well as an additional point 200c of the material (between the first edge 200a and the second edge 200b) optionally adhered to the inner wall of the conduit 100. The additional point 200c runs along the longitudinal axis of the fabric. The conduit 100 having one strip-shaped substrate 200 forms a divided conduit having three channels 310, 320, 330.

FIG. 5 is an illustration of one embodiment of the invention having two strip-shaped substrates forming five channels. Each of the two strip-shaped substrates 200, having a first longitudinal edge 200a and a second longitudinal edge 200b are adhered to the inner wall of the conduit 100. The conduit 100 having two strip-shaped substrates 200 forms a divided conduit having five channels 310, 320, 330, 340, 350.

One process for forming the divided conduit begins with an already formed, free-standing, strip-shaped substrate 200. This already formed strip-shaped substrate is then introduced to the conduit extrusion process where the first and second edges 200a, 200b of the strip-shaped substrate 200 are adhered to or embedded into the inner surface of the conduit 100 during the extrusion of the conduit or directly after the extrusion (while the polymer of the conduit is still above its $T_g$). In this embodiment, the materials of strip-shaped substrate (yarns for a textile or polymer for a film) preferably have a higher melting temperature than the polymer forming the conduit. In the case where the materials of the strip-shaped substrate 200 do not have a melting temperature, preferably strip-shaped substrate must be able to withstand the conduit forming (extrusion processing) conditions without a significant loss in physical properties. During the extrusion process where the conduit is formed, the strip-shaped substrate is introduced into the forming conduit while the conduit is still at least partially molten and pressed into the surface of the molten conduit with, for example, a roller or a flexible rib. This allows the edges of the strip-shaped substrate to be adhered or embedded into the material of the conduit.

Multiple strip-shaped substrates can be introduced into the forming conduit resulting in multiple channels such as shown in FIGS. 2 and 5.

In one embodiment, there are two strip-shaped substrates introduced during the extrusion process to form a conduit having 3 channels 310, 320, and 330 such as shown in FIG. 2. In another embodiment, the strip-shaped substrate 200 is inserted into the extrusion process such that the two edges (first longitudinal edge 200a and second longitudinal edge 200b) are adhered to the inner wall of the conduit as well as another section of the strip-shaped substrate along its longitudinal axis. In this embodiment, shown in FIG. 3, the first longitudinal edge 200a, second longitudinal edge 200b, and an additional point 200c are adhered or embedded into the polymer of the conduit 100. With the one strip-shaped substrate 200, 3 channels 310, 320, and 330 are created.

In another embodiment, the conduit is formed from simultaneously extruding a first molten thermoplastic and a second molten thermoplastic. This simultaneous extrusion of the first and second polymer may be from co-extrusion. The first and second thermoplastics are distinct and different polymers having different compositions, melting temperatures, and/or physical characteristics. The first thermoplastic forms the conduit and the second thermoplastic forms the strip-shaped film within the conduit. The first thermoplastic is selected from the group consisting of polyethylene, polypropylene, polyester, and polyvinyl chloride. The second thermoplastic is selected from the group consisting of polyester, polyolefin, and polyamide. In one embodiment, the second thermoplastic has a melting temperature greater than the melting temperature of the first thermoplastic. In another embodiment, the second thermoplastic polymer is the same polymer as the first thermoplastic, just thinner to allow bending of the strip-shaped film. In another embodiment, the strip-shaped film could have perforations to allow air to flow between channels allowing the strip-shaped film to move out of the way (towards the inner surface of the conduit) when a rope or cable is pulled though the conduit thus increasing the conduit cross-section which results in less friction and easier pull.

In this embodiment, the second molten thermoplastic forms a one strip-shaped substrate in the form of a strip-shaped film having a first longitudinal edge and a second longitudinal edge embedded into the first thermoplastic of the conduit forming two channels. In another embodiment, the second molten thermoplastic forms 2 strip-shaped substrates forming 3 channels. In another embodiment, the second molten thermoplastic forms at least 3 strip-shaped substrates, each having at least one of the edges embedded into the first thermoplastic of the conduit.

The divided conduit may optionally contain pull lines or cords. These may be placed inside the conduit in at least one channel during manufacture of the divided conduit, after conduit formation, or after conduit placement. Pull lines, which are typically tightly woven, relatively flat strips of material, may be used for pulling cables through the channels. However, pull cords having a substantially round cross-section may be used successfully with smaller diameter cables.

In one embodiment, the pull lines are formed of tightly woven, polyester material, which exhibits a tensile strength of between about 400 pounds and about 3,000 pounds. In an alternate embodiment, a twisted round rope (for example, a multi-ply cord) may be used, where such pull cords are made of polypropylene, polyester, and the like.

The divided conduit is designed to contain cables or other elongated objects. These may be placed inside the conduit in at least one channel during manufacture of the divided conduit, after conduit formation, or after conduit placement.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method of producing a divided conduit comprising, in order:
   forming a strip-shaped textile having a first longitudinal edge and a second longitudinal edge, wherein the strip-shaped textile is selected from the group consisting of a woven, non-woven, and knit, wherein the strip-shaped textile is air permeable;
   extruding a molten thermoplastic polymer into the form of an at least partially molten conduit having an inner surface and an outer surface, wherein the inner surface and outer surface of the conduit is continuous;
   placing at least one strip-shaped substrate within the at least partially molten conduit during or directly after conduit formation;
   pressing the first longitudinal and second longitudinal edges of the strip-shaped substrate into the inner surface of the at least partially molten conduit, wherein the first longitudinal and second longitudinal edges of the strip-shaped substrate embed into the inner surface of the conduit.

2. The method of claim 1, wherein the distance between the first longitudinal and second longitudinal edge of the strip-shaped textile is between about 32 and 60% of the circumference of the inner surface of the conduit.

3. The method of claim 1, wherein the distance between the first longitudinal and second longitudinal edge of the strip-shaped textile is greater than the inside diameter of the conduit.

4. The method of claim 1, wherein at least two strip-shaped textiles are placed within the conduit during or directly after formation.

5. The method of claim 1, wherein the strip-shaped textile comprises a polymer having a melting temperature greater than the melting temperature of the thermoplastic polymer of the conduit.

6. The method of claim 1, wherein the strip-shaped textile forms at least two flexible, longitudinal channels for enveloping cables.

* * * * *